United States Patent [19]
Hunt et al.

[11] Patent Number: 5,851,033
[45] Date of Patent: Dec. 22, 1998

[54] CORROSION LIMITING DEVICE

[75] Inventors: E. Stephen Hunt, Arlington, Va.; John M. Jenco, Charlotte, N.C.

[73] Assignee: Electric Power Research Institute, Inc., Palo Alto, Calif.

[21] Appl. No.: 846,709

[22] Filed: Apr. 30, 1997

[51] Int. Cl.[6] .................................................. F16L 55/00
[52] U.S. Cl. ............................... 285/13; 285/45; 285/363
[58] Field of Search ................................. 285/15, 45, 363

[56] References Cited

U.S. PATENT DOCUMENTS

| | | |
|---|---|---|
| Re. 34,144 | 12/1992 | Leigh . |
| 1,035,810 | 8/1912 | Osborne et al. . |
| 1,585,189 | 11/1926 | Emerson . |
| 1,864,957 | 6/1932 | Stout ..................................... 285/45 X |
| 1,876,415 | 9/1932 | Heard ..................................... 285/15 X |
| 3,334,928 | 8/1967 | Schmunk . |
| 3,400,954 | 9/1968 | Brown . |
| 3,441,294 | 4/1969 | Krieg . |
| 3,502,356 | 3/1970 | Schmunk . |
| 3,603,619 | 9/1971 | Bengesser et al. . |
| 3,850,451 | 11/1974 | Matthiessen . |
| 4,082,319 | 4/1978 | Berger et al. . |
| 4,133,351 | 1/1979 | Harrison et al. ....................... 285/15 X |
| 4,170,365 | 10/1979 | Haaland . |
| 4,186,931 | 2/1980 | Anderson . |
| 4,209,029 | 6/1980 | Pennington ............................ 285/15 X |
| 4,298,206 | 11/1981 | Kojima . |
| 4,350,350 | 9/1982 | Blakeley . |
| 4,380,347 | 4/1983 | Sable . |
| 4,406,481 | 9/1983 | Summerell ................................ 285/15 |
| 4,457,517 | 7/1984 | Dunegan ............................... 285/45 X |
| 4,576,401 | 3/1986 | Harrison ................................ 285/15 X |
| 4,635,967 | 1/1987 | Stephenson . |
| 4,779,903 | 10/1988 | Maier et al. . |
| 4,950,002 | 8/1990 | Hormansdorfer . |
| 5,222,747 | 6/1993 | McGarvey . |
| 5,470,110 | 11/1995 | Hupe ..................................... 285/45 X |

*Primary Examiner*—Dave W. Arola
*Attorney, Agent, or Firm*—Flehr Hohbach Test Albritton & Herbert LLP

[57] ABSTRACT

A corrosion limiting device for use with a fluid-carrying piping system having a connection formed from first and second components. A seal is carried by the components for forming a fluid-tight seal between the components. The components form a groove external of the seal. The corrosion limiting device includes an elongate member having first and second end portions and a length sufficient to extend around the groove. At least a portion of the elongate member is adapted to seat within the groove for aligning the elongate member on the components. The first and second end portions of the elongate member are fastened together. The elongate member serves to inhibit corrosion of the connection.

20 Claims, 2 Drawing Sheets

Figure 2:
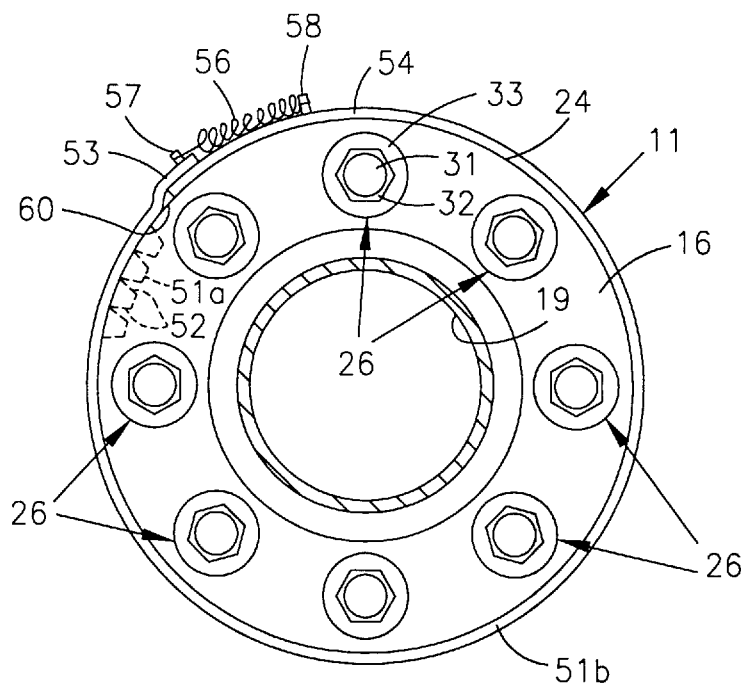

CORROSION LIMITING DEVICE

BRIEF DESCRIPTION OF THE INVENTION

This invention relates to piping systems and more particularly to corrosion protection systems for fasteners and sealing components used in piping system connections.

BACKGROUND OF THE INVENTION

Piping systems typically include connections such as flanged joints and valve body-to-bonnet connections. See, for example, U.S. Pat. Nos. 3,334,928; 3,502,356; 4,186,931; 3,400,954; 4,350,350 and 1,035,810. Many of these piping systems conduct corrosive liquids. In such systems, leaks in a piping system connection can result in accelerated corrosion by the process fluid of the fasteners connecting the components of the connection. Such leaks can result in increased maintenance costs, system inoperability and/or catastrophic failure of the system connection.

OBJECTS AND SUMMARY OF THE INVENTION

The primary object of the present invention is to provide a device to protect fasteners and sealing materials by limiting corrosion in the connection of a piping system.

Another object of the invention is to provide a corrosion limiting device of the above character by limiting the amount of oxygen available to the connection.

Another object of the invention is to provide a corrosion limiting device of the above character which creates a substantially airtight barrier to the space between the components of the connection external of the main fluid seal.

Another object of the invention is to provide a corrosion limiting device of the above character which is longitudinally self-centering on the connection.

Another object of the invention is to provide a corrosion limiting device of the above character which is self compensating to accommodate an offset in the transverse alignment of the connection components.

These and other objects are achieved by a corrosion limiting device for use with a fluid-carrying piping system having a connection formed from first and second components. A seal is carried by the components for forming a fluid-tight seal between the components. The components form a groove external of the seal. The corrosion limiting device includes an elongate member having first and second end portions and a length sufficient to extend around the groove. At least a portion of the elongate member is adapted to seat within the groove for aligning the elongate member on the components. Means is provided for fastening together the first and second end portions of the elongate member. The elongate member serves to inhibit corrosion of the connection.

Additional objects and features of the invention will appear from the following description from which the preferred embodiments are set forth in detail in conjunction with the accompanying drawings.

BRIEF DESCRIPTION OF THE DRAWINGS

FIG. 1 is a cross-sectional view of a connection of a piping system incorporating the corrosion limiting device of the present invention.

FIG. 2 is a cross-sectional view of the connection of FIG. 1 taken along the line 2—2 of FIG. 1.

FIG. 3 a fragmentary view, similar to FIG. 1, of a connection of a piping system incorporating another embodiment of a corrosion limiting device of the present invention.

FIG. 4 is a fragmentary view, similar to FIG. 2 and partially cut away, of a connection of a piping system incorporating a further embodiment of a corrosion limiting device of the present invention.

FIG. 5 is a fragmentary view, similar to FIG. 2 and partially cut away, of a connection of a piping system incorporating yet a further embodiment of a corrosion limiting device of the present invention.

DETAILED DESCRIPTION OF THE INVENTION

Reference will now be made in detail to the preferred embodiments of the invention which are illustrated in the accompanying figures. The description of the embodiments of the invention will be followed by a discussion of their operation.

Corrosion limiting device 11 of the present invention is for use with a conventional fluid-carrying piping system 12 of the type shown in FIGS. 1 and 2. System 12 includes first and second pipes 13 and 14 having ends with respective first and second flanges 16 and 17 attached thereto. Pipes 13 and 14 extend along a central longitudinal axis 18 and each have a central fluid-carrying passageway 19 extending therethrough along axis 18. Each of annular flanges 16 and 17 is formed with a generally planar surface or face 23 and an adjoining outer peripheral or cylindrical surface 24 extending at a right angle to face 23. Means in the form of a plurality of fasteners 26 are provided for securing together first and second flanges 16 and 17. Fasteners 26 extend through a corresponding plurality of bores 27 disposed circumferentially around the flanges and opening through opposed faces 23 thereof. Fasteners 26 each include an elongate threaded stud 31 having a nut 32 threaded to each end thereof. A washer 33 is disposed around the stud 31 between each of nuts 32 and flange 16 or 17.

Means is carried by first and second flanges 16 and 17 for providing a fluid-tight seal therebetween and includes a conventional spiral wound circular gasket 41 disposed between opposed faces 23 and a metal ring in the form of conventional compression stop 42 disposed between faces 23 outside gasket 42 and inside studs 31. When flanges 16 and 17 are so secured together and sealed, faces 23 and compression stop 42 serve to define a space in the form of annular groove 43 which opens out onto outer cylindrical surfaces 24. Flanges 16 and 17, fasteners 26, main sealing gasket 41 and compression stop 42 form a connection 46 in piping system 12.

Corrosion limiting device 11 serves as a barrier carried by flanges 16 and 17 for limiting the amount of oxygen that can enter annular groove 43. The device 11 is formed from an elongate member 51 made from a non-corrosive material such as stainless steel or a high grade plastic. Elongate member 51 has a length at least equal to the circumferential dimension of flanges 16 and 17 defined by cylindrical surfaces 24 so as to permit device 11 to extend around the flanges. The material of elongate member 51 has sufficient flexibility to permit the member to bend around flanges 16 and 17. At least a portion of the elongate member is adapted to seat within annular groove 43. More specifically, as shown in FIGS. 1 and 2, the elongate member 51 has a T-shaped cross-section formed from a longitudinally-extending flange or leg portion **51*a* adapted to seat within annular groove 43 and a longitudinally-extending shoulder or band portion 51*b* which rests on surfaces 24. Leg portion 51*a* is provided with a plurality of longitudinally spaced-apart slots or notches 52** for facilitating bending of elongate member 51. The frequency and size of the pie-shaped notches 52 is determined by the radius to which device 11 is to be formed when disposed about flanges 16 and 17. As shown in FIG. 2, elongate member 51 has opposite first and second end portions 53 and 54. Leg portion 51a ends short of first end portion 53 so that the end portion 53 can extend over and thus overlap a portion of second end portion 54.

Means is included within corrosion limiting device 11 for securing together first and second end portions 53 and 54 and retaining device 11 on connection 46. This means consists of a tensioned coil or connector spring 56 having one end secured to a post 57 extending outwardly from first end portion 53 and a second end secured to a post 58 extending outwardly from second end portion 54. It should be appreciated that other means such as an adhesive (not shown) can be provided for securing together end portions 53 and 54 of elongate member 51 and be within the scope of the present invention.

In operation and use, corrosion limiting device 11 is secured to connection 46 by extending elongate member 51 around the outer cylindrical surfaces 24 of first and second flanges 16 and 17. Leg portion 51a is faced inwardly towards central axis 18 and seated within annular groove 43. Leg portion 51a longitudinally centers device 11 on connection 46 and prevents longitudinal shifting of device 11 thereafter. The band portion 51b abuts surfaces 24. End portions 53 and 54 are pulled taut relative to each other so that first end portion 53 extends over second end portion 54. Connector spring 56 is then attached to posts 57 and 58 to secure the device 11 to connection 46 and maintain tension on the device 11.

Corrosion limiting device 11 forms a substantially airtight barrier between the outer peripheries of flanges 16 and 17 to thus inhibit the ingress of oxygen into annular groove 43. The material of elongate body 51 is chosen so as to be chemically compatible with the fluid carried within passageways 19 and the temperature range experienced by connection 46 during operation. Should a leak occur in the seal created by gasket 41 and fluid from within passageways 19 enter annular groove 43, device 11 limits the corrosion to flanges 16 and 17, fasteners 26 and compression stop 42 by minimizing the amount of oxygen allowable for the corrosion process.

Device 11 causes any such leaking fluid to create an equal or slightly positive pressure within groove 43 relative to the atmospheric pressure surrounding connection 46. The barrier formed by device 11, and any relative positive pressure created thereby, assists in precluding oxygen from entering groove 43 through or around device 11. Accordingly, after the initial corrosion process has depleted the existing oxygen in annular groove 43, minimal if any further corrosion should occur. The low tension exerted longitudinally on device 11 by connector spring 56 permits any such leaking fluid to egress annular groove 43 through at least one opening 60.

Figure 1:
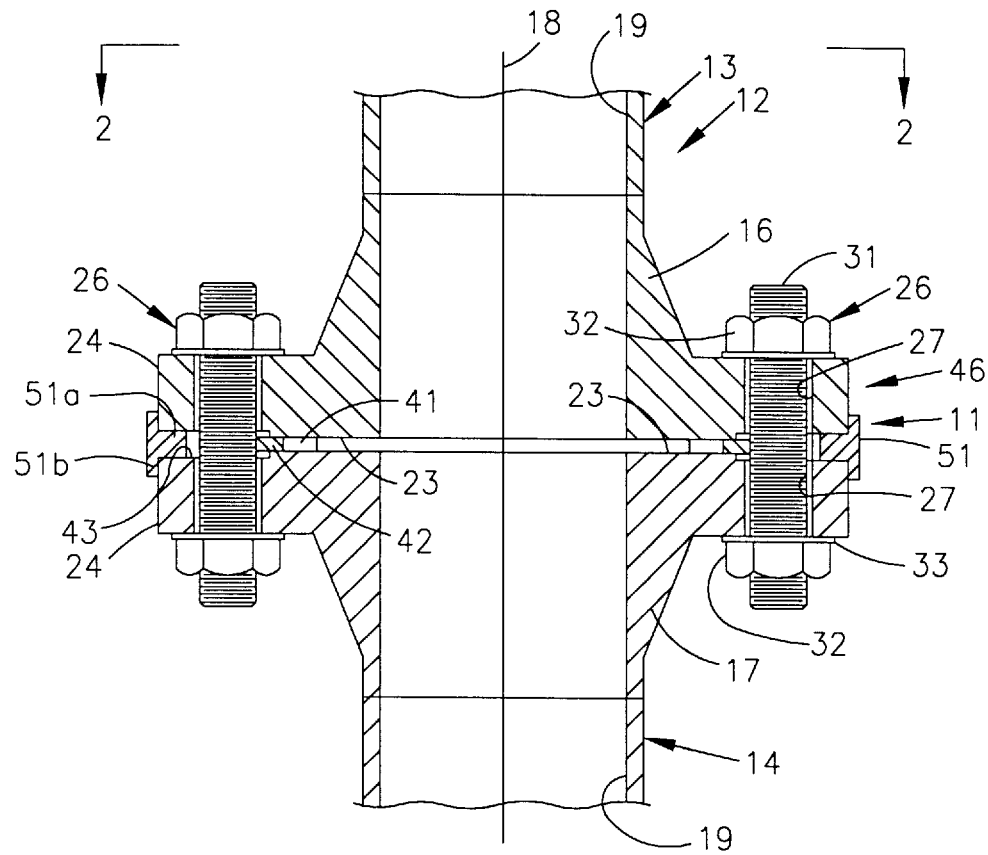
Figure 3:
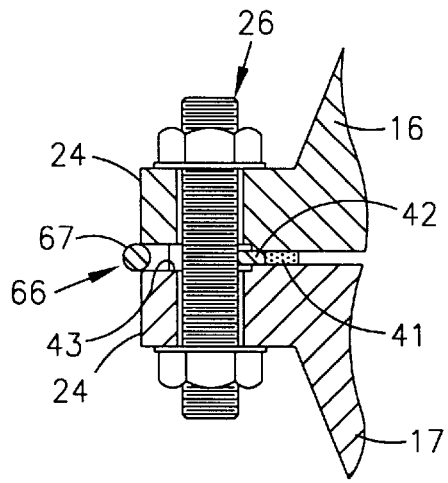

Other embodiments of the corrosion limiting device of the present invention exist. Corrosion limiting device 66, shown in FIG. 3, is also for use on a connection 46. Like reference numerals have been used in FIG. 3 to identify like components shown therein and in FIGS. 1 and 2. Corrosion limiting device 66 includes an elongate flexible member 67 which is cylindrical in cross-section and made from any suitable flexible elastomeric material so as to be bendable about flanges 16 and 17 and extendable or stretchable in length thereabout. The material of elongate member 67 is selected so as to be chemically compatible with the process fluid carried within piping system 12 and the temperature range at which device 66 is to be used. Such suitable materials include nitrile. The elongate member 67 has a length sufficient to permit it to extend around outer cylindrical surfaces 24 of first and second flanges 16 and 17. More specifically, the opposite first and second ends of elongate member 67 substantially abut when the member 67 is extended or stretched around surfaces 24 and at least partially seated within annular groove 43. Elongate member 67 is thus in tension when disposed about flanges 16 and 17 and seated within groove 43. The diameter of elongate member 67 is greater than the transverse dimension or width of annular groove 43 between faces 23 so that only a portion of the elongate member 67 seats within groove 43. Means for securing together the end portions of the elongate member 67 consists of any suitable adhesive such as a cyanoacrylate adhesive.

The operation and use of corrosion limiting device 66 is similar to that of device 11 discussed above. Device 66 is tensioned when secured to flanges 16 and 17 so as to remain properly positioned within annular groove 43. The cylindrical conformation of elongate member 67 permits device 66 to self-center longitudinally on flanges 16 and 17. The seating of at least a portion of device 66 within groove 43 discourages longitudinal shifting of the device. Member 67 self-compensates and provides a substantially airtight barrier around groove 43 despite any offset transverse alignment of flanges 16 and 17 relative to central longitudinal axis 18. O-ring-like member 67 thus serves to create an equal or slightly positive pressure in annular groove 43 relative to atmospheric pressure and limit corrosion to flanges 16 and 17, fasteners 26 and compression stop 42. The low tension on member 67 permits any leaking fluid to egress annular groove 43.

Figure 4:
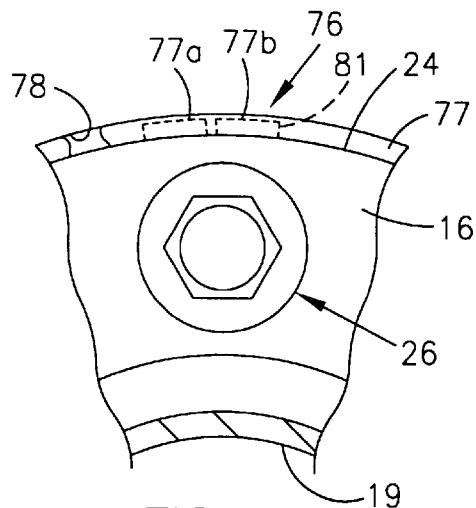

In a further embodiment of the device of the present invention, a corrosion limiting device 76 is provided which is substantially similar to device 66 (see FIG. 4). Like reference numerals have been used in FIG. 4 to identify like components shown therein and in FIGS. 1–3. Corrosion limiting device 76 includes an elongate flexible member 77 made from an elastomeric material. Member 77 has an extendible length sufficient to permit device 76 to extend around flanges 16 and 17 when seated within annular groove 43. The elongate member 77 has first and second end portions 77a and 77b and a bore 78 extending longitudinally therethrough so as to be tubular in conformation. Means for fastening together first and second end portions 77a and 77b is provided and consists of an elongate male plug 81 which is cylindrical in shape. Plug 81 is made from any suitable materials such as plastic. One end of plug 81 is disposed within bore 78 in first end portion 77a and the other end of the plug is disposed within bore 78 in second end portion 77b. Plug 81 is diametrically sized relative to bore 78 so as to slip into bore 78 with an interference fit. In addition, a suitable adhesive can be provided for securing plug 81 to elongate member 77.

In operation and use, corrosion limiting device 76 is secured around connection 46 with at least a portion of elongate member 77 disposed within annular grooves 43. Device 76 thus self-centers itself on connection 46. As discussed above with respect to device 66, the cylindrical shape of elongate member 77 permits device 76 to accommodate transverse misalignments between first and second flanges 16 and 17. When so disposed on connection 46, device 76 serves to inhibit the ingress of oxygen into annular groove 43 and thus limit the corrosion process therein should a leak occur in connection 46.

Figure 5:
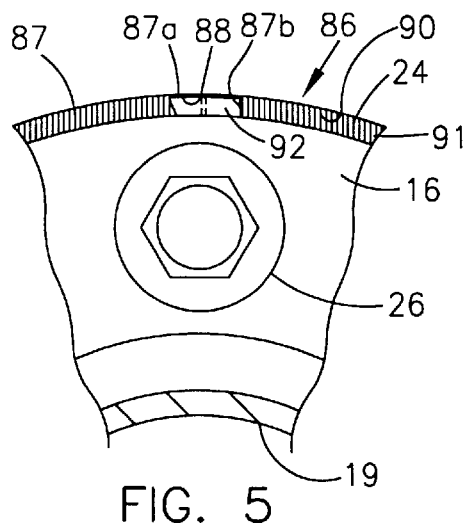

In yet a further embodiment of the device of the present invention, a corrosion limiting device 86 is provided which is similar to devices 66 and 76 (see FIG. 5). Like reference numerals have been used in FIG. 5 to identify like components shown therein and in FIGS. 1–4. Device 86 includes an elongate flexible member 87 having an extendible length sufficient to permit mounting of the device 86 about flanges 16 and 17. Elongate member 87 has first and second end portions 87a and 87b and a bore 88 extending longitudinally therethrough so as to be tubular in conformation. The elongate member 87 consists of an extension spring with an external diameter greater than the transverse dimension of annular groove 43 in connection 46. Spring 87 is formed from a plurality of coils 91. It is preferable that spring 87 have a fine wire diameter so as to minimize the leak path through the plurality of opening 90 between coils 91. Factors determining the wire diameter of a particular extension spring are the diameter of outer cylindrical surfaces 24 and the transverse dimension of annular groove 43. The material of extension spring 87 is chemically compatible with the process fluid carried by piping system 12 and the operating temperature range of connection 46. Examples of suitable materials are stainless steel and high grade plastics.

Means for securing together first and second end portions 87a and 87b of extension spring 87 includes a male plug 92 substantially similar to plug 81. One end of plug 92 is insertable into first end portion 87a and the other end of the plug 92 is insertable into second end portion 87b, in each case, with an interference fit. An adhesive can be further provided for securing plug 92 to extension spring 87.

Corrosion limiting device 86 operates in substantially the same manner as devices 66 and 76 discussed above to inhibit the amount of oxygen available to annular groove 43 and thus limit the corrosion process to connection 46. Although some spacing may exist between coils 91 of extension spring 87, such as openings 90, corrosion limiting device 86 serves to create a substantially airtight barrier around annular groove 43.

It should be appreciated that the corrosion limiting devices described herein can be used with connections having components other than flanges and be within the scope of the present invention. For example, a corrosion limiting device can be used on a valve body-to-bonnet connection. In addition, corrosion limiting devices having cylindrical or other conformations can be provided. For example, a cylindrical device can be multi-sided in cross-section. Further, the corrosion limiting devices hereof can have conformations which are not circular, such as triangular or square, so as to accommodate non-circular connection components.

From the foregoing, it can be seen that a device for limiting corrosion in the connection of a piping system is provided. The device limits the amount of oxygen available to the connection. The device creates a substantially airtight barrier to the space between the components of the connection external of the main fluid seal. The device is longitudinally self-centering on the connection and is self compensating to accommodate an offset in the transverse alignment of the components.

What is claimed is:

1. A corrosion limiting device for use in an environment with a piping system carrying a fluid and having a connection formed from first and second components, a seal carried by the components for forming a fluid-tight seal between the components, the components forming a groove external of the seal, comprising an elongate member having first and second end portions and a length sufficient to extend around the groove, at least a portion of the elongate member being adapted to seat within the groove for aligning the elongate member on the components and means for fastening together the first and second end portions of the elongate member when the elongate member is extending around the groove, the elongate member providing at least one opening between the groove and the environment for permitting any fluid which has leaked from the seal to pass into the environment so as to inhibit the accumulation of any such fluid within the groove, the elongate member having sufficient circumferential continuity for limiting the ingress of oxygen from the environment into the groove and thus inhibiting corrosion of the connection.

2. The device of claim 1 wherein the elongate member is flexible.

3. The device of claim 1 wherein the elongate member is made from metal.

4. The device of claim 1 wherein the elongate member is made from an elastomeric material.

5. The device of claim 4 wherein the elongate member is tubular.

6. The device of claim 1 wherein the elongate member is tubular.

7. The device of claim 6 wherein the elongate member is a spring.

8. The device of claim 1 wherein the elongate member has an inwardly extending flange for extending into the groove.

9. The device of claim 8 wherein the elongate member is T-shaped in cross-section.

10. The device of claim 1 wherein the elongate member includes a band for extending around the components.

11. The device of claim 1 wherein the elongate member is bendable into an annular configuration for extending around the components.

12. A connection in a piping system which is used in an environment to carry a fluid comprising first and second components provided with respective communicating passages adapted to carry the fluid, a plurality of fasteners carried by the components for securing the components together, a seal carried by the components around the passages for forming a fluid-tight seal between the components, the components having a space therebetween external of the seal and a barrier carried by the components for separating the space from the environment, the barrier providing at least one opening between the space and the environment for permitting any fluid which has leaked from the seal to pass into the environment so as to inhibit the accumulation of any such fluid within the space, the barrier having sufficient continuity for limiting the amount of oxygen from the environment available to the space and thus inhibiting corrosion within the space.

13. The connection of claim 12 wherein each of the components has an outer peripheral surface, the space consisting of a groove extending around the components between the outer peripheral surfaces.

14. The connection of claim 13 wherein at least a portion of the barrier is disposed in the groove.

15. The connection of claim 12 wherein the barrier is a cylindrical member extending around the components.

16. The connection of claim 15 wherein the cylindrical member is tubular in conformation.

17. The connection of claim 15 wherein the cylindrical member is extendable.

18. The connection of claim 17 wherein the cylindrical member is made from an elastomeric material.

19. The connection of claim 12 wherein the components are flanges.

20. The connection of claim 19 wherein the flanges are annular.

* * * * *